United States Patent
Fasching

(10) Patent No.: US 8,271,362 B2
(45) Date of Patent: Sep. 18, 2012

(54) METHODS AND APPARATUS FOR PROVIDING CENTRALIZED WEB SERVICES FOR FUNDS TRANSFER SYSTEM

(75) Inventor: Georg Fasching, London (GB)

(73) Assignee: MasterCard International, Inc., Purchase, NY (US)

( * ) Notice: Subject to any disclaimer, the term of this patent is extended or adjusted under 35 U.S.C. 154(b) by 91 days.

(21) Appl. No.: 12/488,840

(22) Filed: Jun. 22, 2009

(65) Prior Publication Data
US 2010/0325021 A1  Dec. 23, 2010

(51) Int. Cl.
*G07F 19/00* (2006.01)
*G06Q 40/00* (2012.01)

(52) U.S. Cl. .................................... 705/30; 705/39
(58) Field of Classification Search ............ 705/35, 705/39
See application file for complete search history.

(56) References Cited

U.S. PATENT DOCUMENTS

| | | | |
|---|---|---|---|
| 6,983,362 B1 * | 1/2006 | Kidder et al. ................... 713/1 |
| 7,840,970 B2 * | 11/2010 | Liang ............................ 719/329 |
| 2003/0101111 A1 | 5/2003 | Dang et al. |
| 2003/0119478 A1 * | 6/2003 | Nagy et al. .................... 455/408 |
| 2004/0148252 A1 | 7/2004 | Fleishman |
| 2006/0206425 A1 | 9/2006 | Sharma |
| 2006/0287953 A1 | 12/2006 | Chauhan |
| 2007/0101415 A1 * | 5/2007 | Masui ............................. 726/5 |
| 2007/0226139 A1 * | 9/2007 | Crumbach et al. ............. 705/40 |
| 2007/0228150 A1 * | 10/2007 | Fillinger et al. ............... 235/379 |
| 2007/0255653 A1 * | 11/2007 | Tumminaro et al. ........... 705/39 |
| 2007/0255662 A1 | 11/2007 | Tumminaro |
| 2008/0249929 A1 * | 10/2008 | Hill et al. ....................... 705/39 |
| 2008/0249935 A1 | 10/2008 | Chan et al. |

OTHER PUBLICATIONS

"PCT International Search Report of the International Searching Authority", dated Aug. 5, 2010 for PCT/US2010/038485, 2pgs.
"PCT International Preliminary and Written Opinion of the International Searching Authority", dated Jan. 4, 2012, for International Application No. PCT/US2010/038485, 7pgs.

* cited by examiner

*Primary Examiner* — Ryan Zeender
*Assistant Examiner* — Kristie A Mahone
(74) *Attorney, Agent, or Firm* — Buckley, Maschoff & Talwalkar LLC

(57) ABSTRACT

A method of operating a centralized web services computer system includes providing a standard interface for financial institutions (FIs) and for funds transfer service providers that participate in a remittance system. The centralized web services computer system may also provide services such as integrating its operations into online banking or customer service representative web environments provided by the FIs. The centralized web services computer system may also provide services related to routing messages, looking up territory-related information, checking user information against blacklists, issuing instructions to FIs to debit or credit user accounts, and/or generating reports.

19 Claims, 13 Drawing Sheets

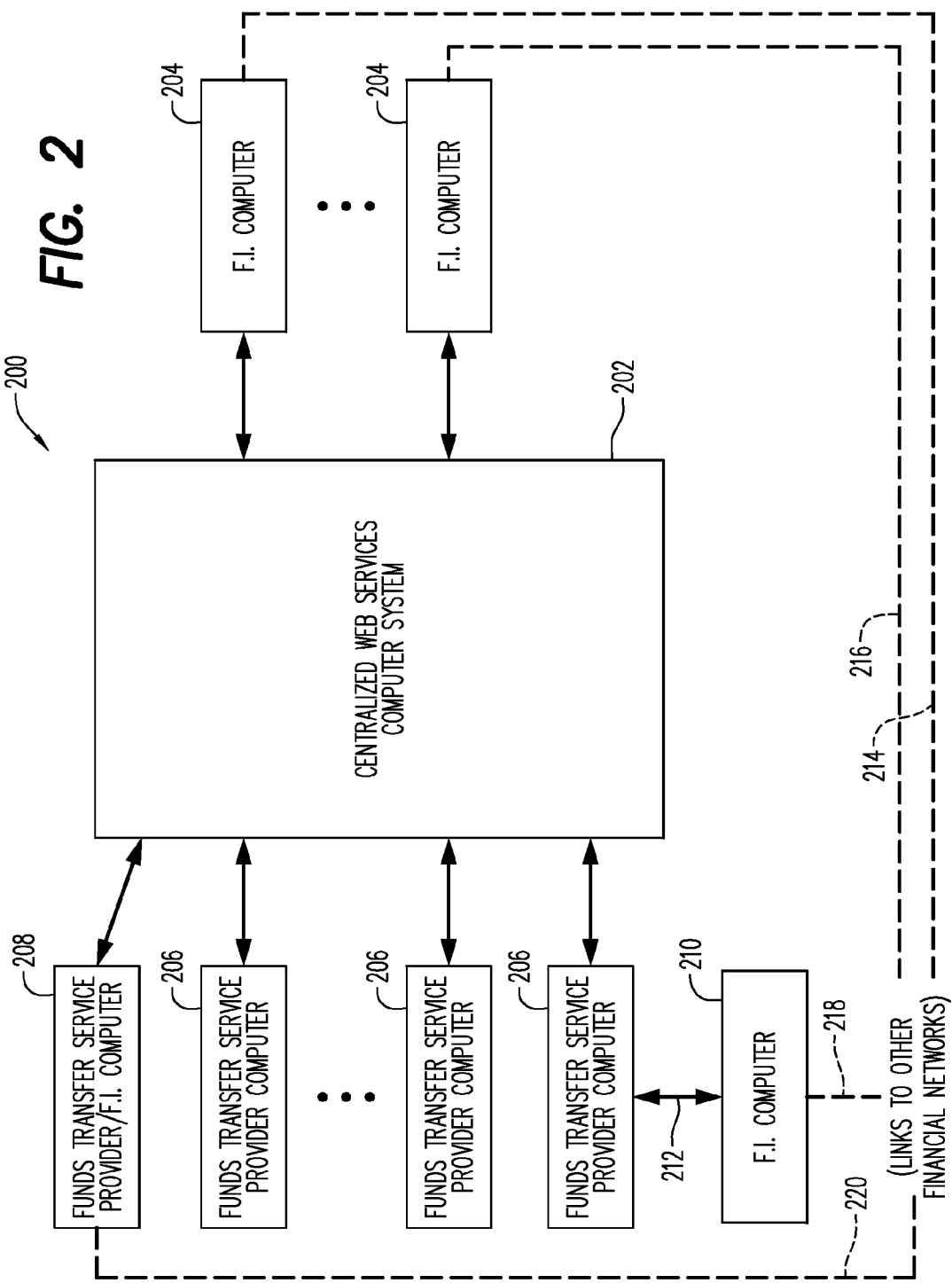

METHODS AND APPARATUS FOR PROVIDING CENTRALIZED WEB SERVICES FOR FUNDS TRANSFER SYSTEM

BACKGROUND

Embodiments disclosed herein relate to remittance systems, domestic and cross-border alike. In particular, some embodiments relate to methods, apparatus, systems, means and computer program products for implementing a remittance system.

The total annual volume of person-to-person remittances is measured in the hundreds of billions of U.S. dollars (including transactions that involve U.S. dollars and transactions that do not involve U.S. dollars) and is increasing from year to year.

Formal commercial remittance channels are generally labor-intensive and expensive to use. Informal channels for remittances are also labor-intensive and may not provide adequate protection for the funds remitted. Many of the people who make or receive remittances are not wealthy and can ill-afford the costs and risks presented by conventional remittance channels.

More generally, senders and recipients of remittances frequently find conventional remittance channels to be time-consuming and inconvenient. It is not unusual for the sender to be required to bring cash to a store operated by a remittance services provider (RSP). Accordingly, the sender is constrained to accommodate himself or herself to the store's operating hours, must carry cash on his or her person, and may have to wait in line or otherwise experience poor service at the RSP's store. The recipient also may be required to travel to an RSP's store to pick up the remitted funds, thereby possibly suffering the same disadvantages and inconveniences that the sender was subject to.

It has previously been proposed to utilize a payment card system as the "backbone" of a person-to-person remittance system. A very well known and extremely extensive payment card system is operated by the assignee hereof—MasterCard International Inc.—in conjunction with its member financial institutions (FIs). A remittance system which uses a payment card system as its processing backbone is likely to offer cost-effectiveness and convenience that go far beyond what is provided by traditional remittance channels. Specific examples of payment-card-system-based remittance systems are described, for example, in co-pending U.S. patent application Ser. No. 11/836,956, filed Aug. 10, 2007 and Ser. No. 11/951,043, filed Dec. 5, 2007. These applications are both assigned to the assignee hereof, are incorporated herein by reference, and have been published as U.S. Patent Publication Nos. 2008/0249929 and 2008/0249935, respectively.

One of the benefits of basing a remittance system on a payment card system is that a large number of financial institutions may be members of the payment card system and so may readily become participants in providing remittance services that use the payment card system. It may also be the case that other service providers, such a mobile telephone network operators or providers of financial services that are not financial institutions, may act as gateways to the remittance system. The present inventor has recognized the desirability of providing improved interoperability among FIs and non-FI service providers in order to facilitate expansion and operation of a remittance system that is based on a payment card system. Said FIs and non-FIs can operate the remittance system pursuant to their own licenses, liability and funds risk. The payment card system facilitates their easy connection to one another and efficient processing of funds transfers for them.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIG. 2 is a block diagram that illustrates a system that may be provided in accordance with aspects of the present invention.

DETAILED DESCRIPTION

In general, and for the purpose of introducing concepts of embodiments of the present invention, a centralized web services computer system is provided to facilitate connectivity among numerous financial institutions and plural service providers that may cooperate to provide a person-to-person remittance system. The functions performed by the centralized web services computer system may include interfacing FIs and/or service providers to other participants in the system, system-wide messaging, central data storage and look up, central functional web services, transaction management and reporting.

With provision of a centralized web services computer system in accordance with aspects of the present invention, there may be a substantial reduction in cost for new participants (FIs and service providers) to join the remittance system as well as operating economies for the remittance system.

Figure 1A:
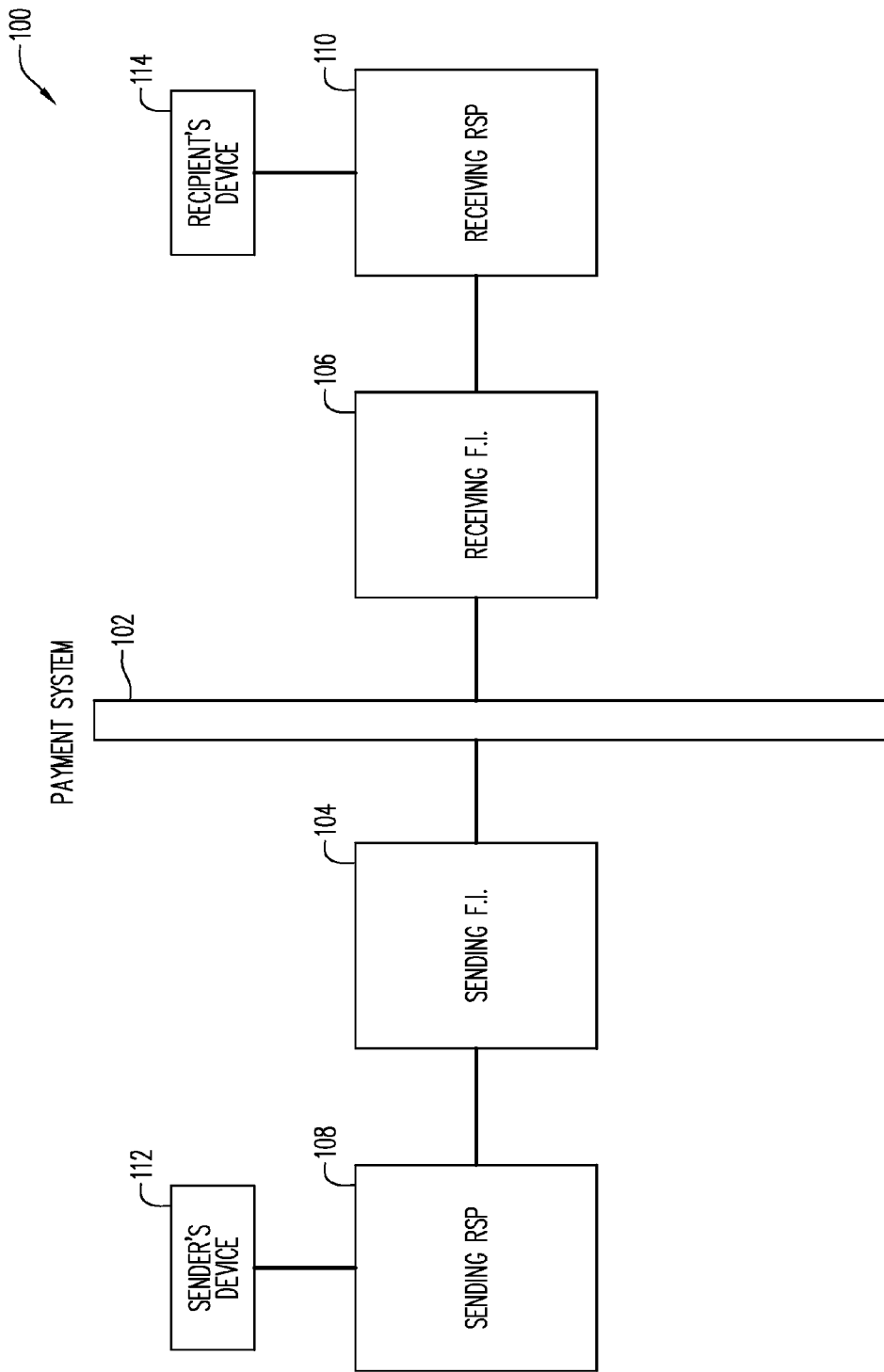
FIG. 1A is a block diagram that illustrates an embodiment of a remittance system with respect to which the present invention may be applied.
Figure 1B:
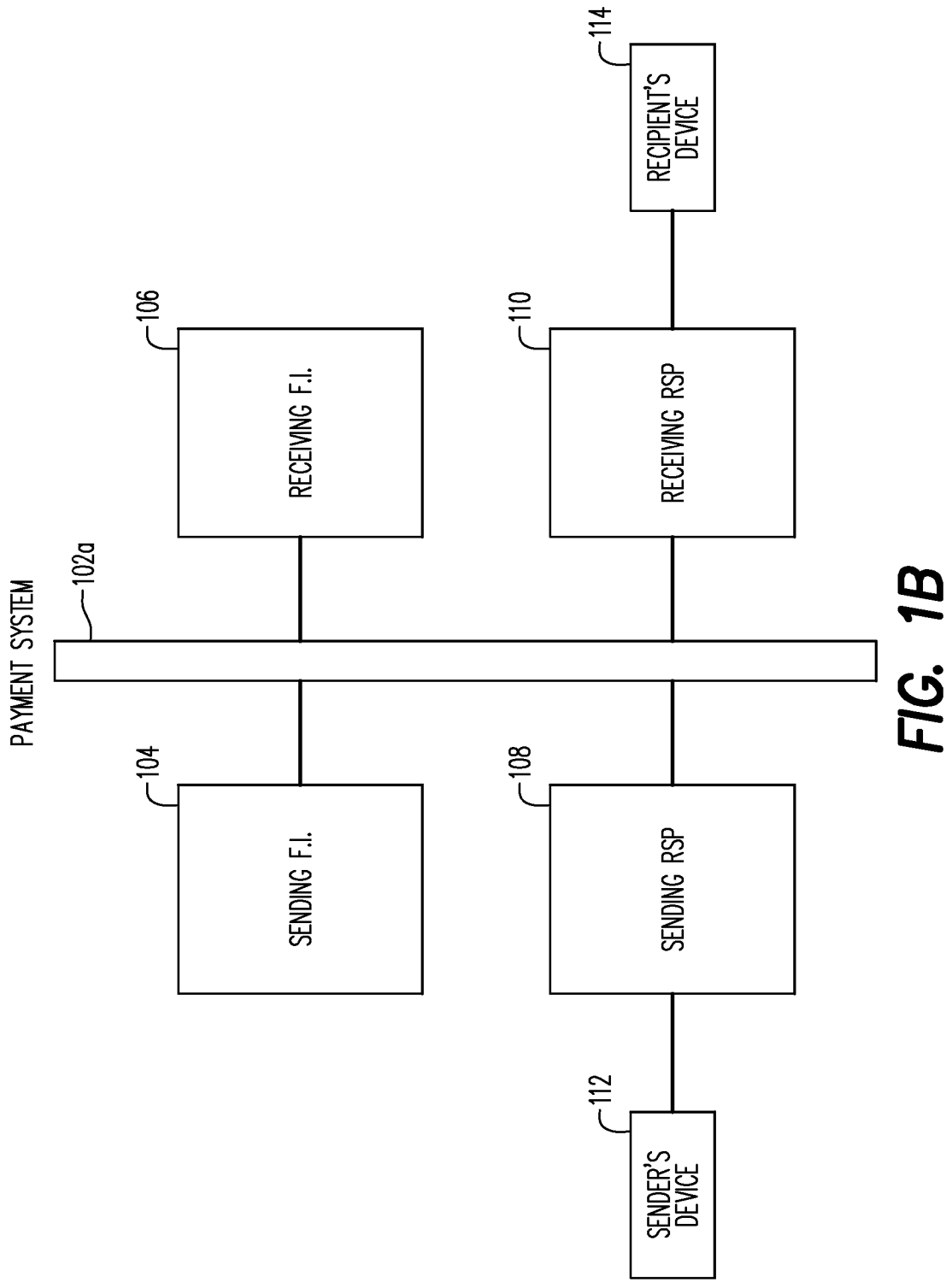
FIG. 1B is a block diagram that illustrates an alternative embodiment of a remittance system, in which remittance service providers may interact with participating FIs via a payment card system (in accordance with aspects of the present invention) rather than directly.

FIGS. 1A and 1B are block diagrams that illustrate embodiments of a remittance system 100 with respect to which the present invention may be applied.

At the heart of the remittance system 100 is a payment system 102. The payment system 102 operates to route and clear funds transfers from the financial institutions of remittance senders to the financial institutions of remittance recipients. One example of a suitable payment system is the BANKNET system, which is well-known to those who are skilled in the art, and which is operated by the assignee hereof. To briefly describe capabilities of the BANKNET system, it routes payment card account purchase transactions from acquirer financial institutions (that serve merchants) to issuer financial institutions (that issue payment card accounts to consumers, small businesses, large entities, etc.). In accordance with a feature that is particularly relevant to the remittance system 100, the BANKNET system also supports "payment transactions" by which funds are transferred from a payment card account issued by the FI which initiates the transaction to another payment card account issued by a different FI. In a sense, in a payment transaction funds flow in the opposite direction from a purchase transaction.

In practice, the remittance system 100 may have numerous FIs as members, potentially all of the member FIs of the payment card association which operates the payment system 102. However, for purposes of illustration, FIGS. 1A and 1B show only two FIs, namely a sending FI 104 from which a particular remittance transaction is sent, and a receiving FI 106 to which that transaction is sent.

By the same token, FIGS. 1A and 1B show only two service providers, namely a sending remittance service provider (RSP) 108 from which the particular transaction is initiated and a receiving remittance service provider 110 which provides services to the recipient of the remittance transactions. Again, however, the remittance system may include as participating RSPs considerably more than the two RSPs shown in the drawing.

It will be noted that in FIG. 2B, in contradistinction to FIG. 1A, the RSPs 108 and 110 may be directly in communication with the payment system (denoted as 102a in FIG. 1B) and may communicate with the FIs via the payment system 102a FIGS. 1A and 1B also show an electronic device 112 (e.g., a mobile telephone, a personal computer, a PDA, etc.) by which the sender of the particular remittance transaction interacts with the sending RSP 108, and another electronic device 114 by which the recipient of the transaction interacts with the receiving RSP 110. It will be appreciated that a large number of senders and recipients may potentially be served by the remittance system 100, and that accordingly a large number of sender devices and recipient devices may at least occasionally interact with the remittance system 100.

Thus FIGS. 1A and 1B illustrate a shared concept for a remittance system, except that in the FIG. 1B scenario the RSPs may be directly connected to the payment card system thus allowing the RSPs to interface indirectly with an FI without needing to arrange for direct connections with the FI in question.

In an example remittance transaction in the remittance system 100, the sender may operate his/her device 112 to communicate with the sending RSP 108 in order to initiate the remittance transaction. It is assumed for purposes of this example that the sender has previously registered himself/herself with the sending RSP 108 and has also previously registered with the sending RSP the identity and payment card account number of the intended recipient of the remittance. Accordingly, the RSP may already have on record the payment card account numbers of the sender and of the recipient. In initiating the remittance transaction, the sender may also specify the amount to be remitted to the recipient. The communication between the sender and the sending RSP may also involve a suitable authentication procedure, such as entry of a PIN by the sender, and verification of the PIN by the sending RSP.

In response to the sender's communication, the sending RSP 108 may communicate with the sending FI 104 (either directly or indirectly via the payment system 102a) to initiate a payment transaction via the payment system 102/102a to effect a funds transfer in the selected amount from the sender's payment card account to the recipient's payment card account. It may be presumed that the sending FI 104 is the issuer of the sender's payment card account. (Alternatively, however, the remittance transaction may involve three FIs—namely an acquirer FI, a sending FI and a receiving FI—as exemplified by the system/process illustrated in FIGS. 2 and 11A-11B and described at paragraphs 0036-0038 and 0099-0116 of the above-referenced publication no. 2008/0249929.) The sending FI 104 may transmit a request for the payment transaction to the payment system 102 for routing to the receiving FI 106, which may be the issuer of the recipient's payment card account. If all is in order, the payment transaction is consummated (including subsequent clearing between the sending and receiving FIs if required by the payment system), resulting in the desired funds transfer. The receiving FI may initiate a notification of the transfer to the recipient device 114 via the receiving RSP 110. (The communication from the receiving FI to the receiving RSP may be direct or alternatively may be via the payment system 102a.) There may also be a suitable confirmation sent back to the sender's device 112 that the remittance transaction has been completed successfully.

As will be understood by subsequent discussion, at least some aspects of communication among the FIs and the RSPs, as well as mapping of user information and other services related to the remittance system may be implemented, in accordance with aspects of the invention, via a centralized web services computer system, as described below.

Turning then to FIG. 2, a system 200 provided in accordance with aspects of the present invention includes the above-mentioned centralized web services computer system, which is indicated by reference numeral 202. The centralized web services computer system 202 provides standard interfaces and services as described below to FI computers 204 and to funds transfer service provider computers 206.

The FI computers 204 may be operated by FIs (e.g., payment card account issuers) such as the FIs 104 and 106 shown in FIGS. 1A and 1B. The FIs in question may be participants in a remittance system such as that shown in FIGS. 1A/1B, and their computers 204 may interact with the centralized web services computer system 202 as needed (e.g., on frequent occasions). Although only two FI computers 204 are explicitly shown in FIG. 2, the actual number of FI computers that interact with the centralized web services computer system 202 may be quite large.

Similarly, the funds transfer service provider computers 206 may be operated by RSPs such as those shown in FIG. 1. The RSPs as well may be participants in the remittance system of FIG. 1, and their computers 206 may interact with the centralized web services computer system 202 as needed. Only three funds transfer service provider computers 206 are explicitly shown in FIG. 2, but in practice the number of such computers may be larger (or smaller).

Also shown in FIG. 2 is a computer 208 which is operated by an FI (payment card account issuer) that also operates as an RSP. The computer 208 is also illustrated as interacting with the centralized web services computer system 202. Again, there may be more than one such FI/RSP which operates a computer 208 that interacts with the centralized web services computer system 202.

Another block shown in FIG. 2, and indicated by reference numeral 210, represents a computer operated by an FI that (unlike the FIs which operate computers 204 and 208) is not an issuer of payment card accounts for the system serviced by the payment system 102 (FIG. 1). However, as indicated at 212 in FIG. 2, the FI computer 210 may interact with one of the funds transfer service provider computers 206. As indicated schematically at 214, 216, 218 and 220 the FI computers 204, 208 and 210 may be linked to other payment systems that are different from the payment system 102 shown in FIG. 1. (For example, the FIs which operate computers 204, 208 may all be MASTERCARD issuers, and also may be VISA issuers; the FI which operates computer 210 may be a VISA issuer but not a MASTERCARD issuer. Some FIs which operate computers 204 may be MASTERCARD issuers but not VISA issuers.)

The centralized web services computer system 202 may, for example, be operated by the operator of the payment system 102 (FIG. 1).

Figure 3:
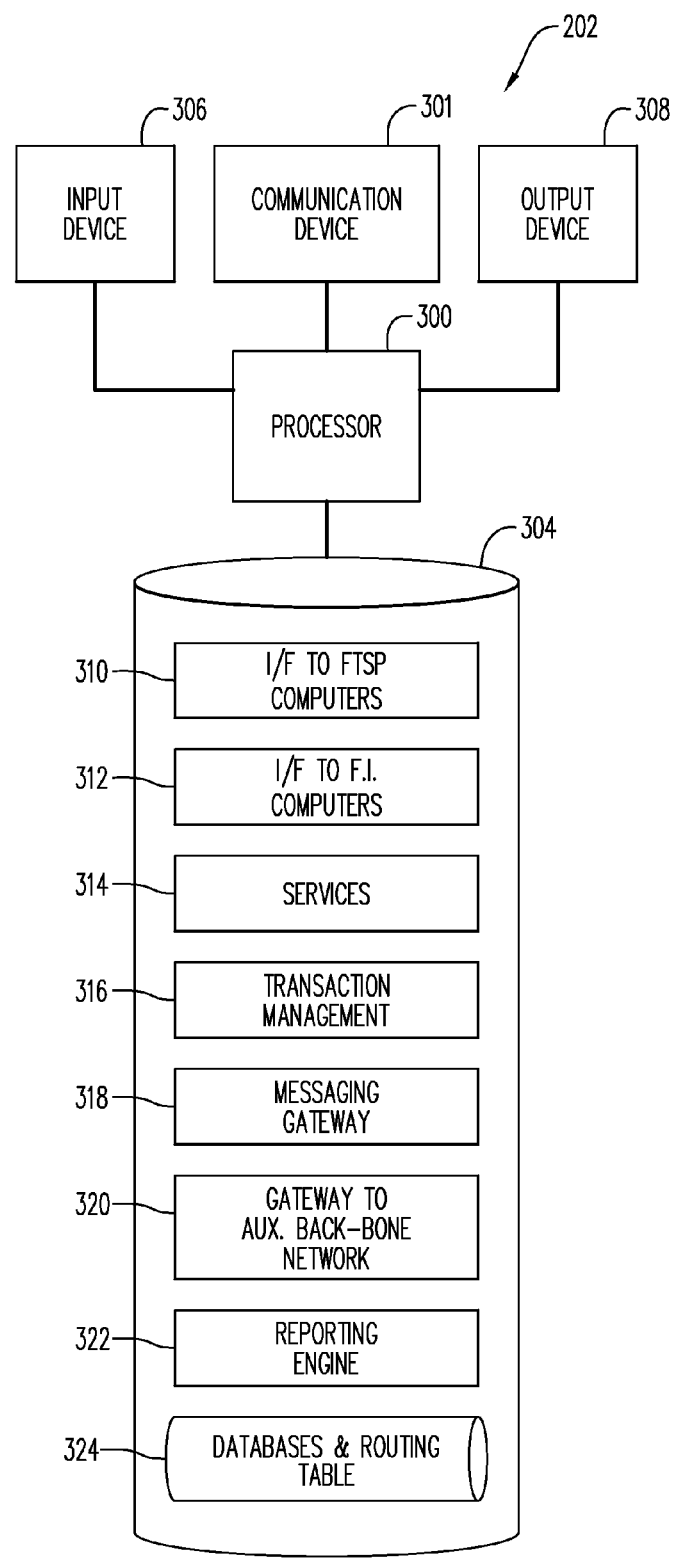
FIG. 3 is a block diagram that illustrates an embodiment of a centralized web services computer system that is part of the system of FIG. 2 and that may be provided in accordance with aspects of the present invention.

FIG. 3 is a block diagram that illustrates an embodiment of the centralized web services computer system 202.

The centralized web services computer system 202 may be conventional in its hardware aspects but may be controlled by software to cause it to operate in accordance with aspects of the present invention. For example, the centralized web services computer system 202 may be constituted by conventional server computer hardware.

The centralized web services computer system 202 may include a computer processor 300 operatively coupled to a communication device 301, a storage device 304, an input device 306 and an output device 308.

The computer processor 300 may be constituted by one or more conventional processors. Processor 300 operates to execute processor-executable steps, contained in program instructions described below, so as to control the centralized web services computer system 202 to provide desired functionality.

Communication device 301 may be used to facilitate communication with, for example, other devices (such as the computers 204, 206, 208 shown in FIG. 2). For example, communication device 301 may comprise numerous communication ports (not separately shown), to allow the centralized web services computer system 202 to provide services simultaneously to numerous client computers.

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium.

Storage device 304 stores one or more programs for controlling processor 300. The programs comprise program instructions (which may be referred to as computer readable program code means) that contain processor-executable process steps of centralized web services computer system 202, including, in some cases, process steps that constitute processes provided in accordance with principles of the present invention, as described in more detail below.

The programs may include an interface 310 that controls the processor 300 to provide a standard interface (e.g. an application programming interface or "API") by which funds transfer service provider computers may call services provided by the centralized web services computer system 202. (The services provided to funds transfer service provider computers by the centralized web services computer system 202 are described below.)

The programs may also include an interface 312 that controls the processor 300 to provide a standard interface (e.g., another API) by which FI computers may call services provided by the centralized web services computer system 202. (The services provided to FI computers by the centralized web services computer system 202 are described below.)

Other programs or program modules stored on the storage device 304 are indicated by block 314 and may control the centralized web services computer system 202 for the purpose of providing the above-mentioned services to the funds transfer service provider computers and the FI computers.

Figure 4:
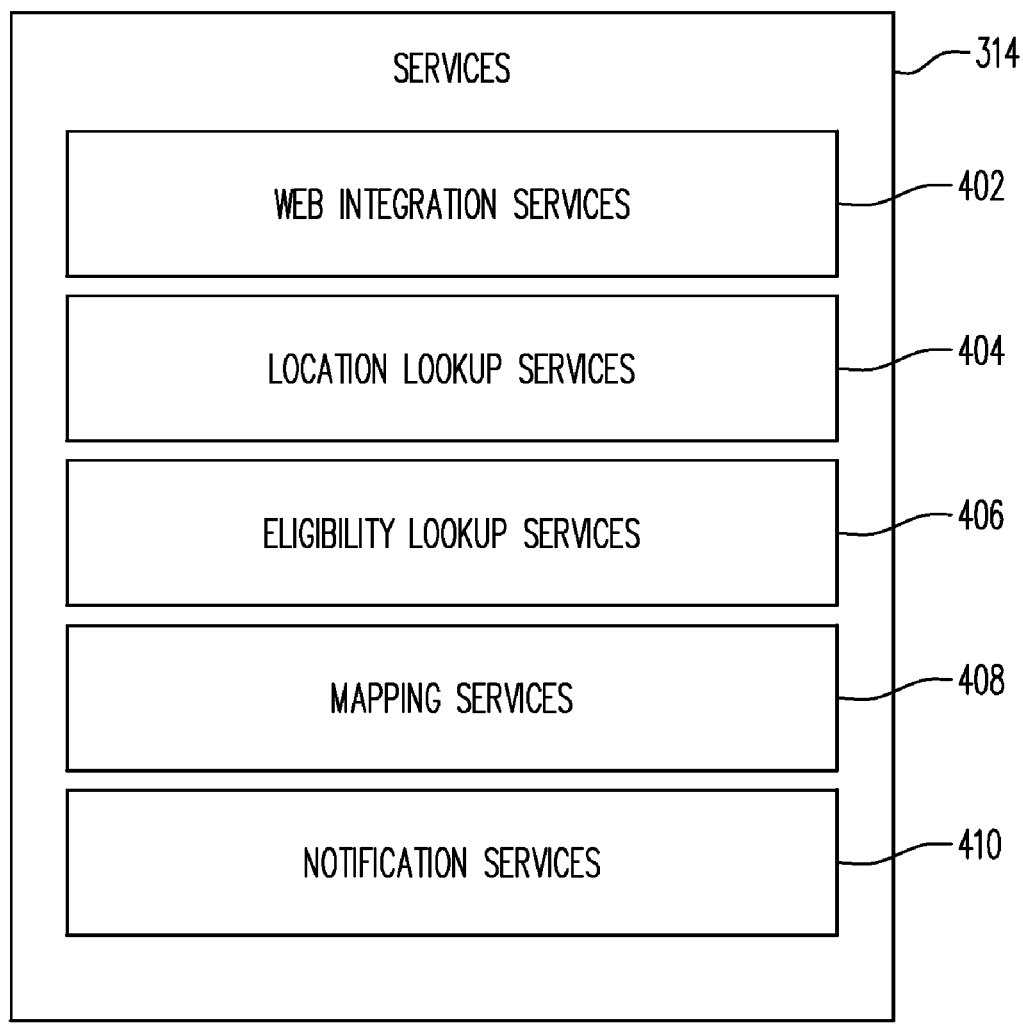
FIG. 4 is a block diagram that illustrates services that may be provided by the centralized web services computer system of FIG. 3.

FIG. 4 is a block diagram that illustrates services (represented by block 314 in FIG. 3) that may be provided by the centralized web services computer system 202 to the FI computers and the funds transfer service provider computers.

Referring to FIG. 4, block 402 represents web integration services provided by the centralized web services computer system 202 to the FI computers. These services may allow the FI computers to plug services provided by the centralized web services computer system 202 into the web environment (e.g. online banking) provided to FI customers or the customer service representative (CSR) environment provided by the FI computers. For example, the services may include customer registration (handled by the customer himself or herself or by the CSR), account administration functions, account management, initiating of remittances, displaying of account usage history, issuing charge-backs, etc.

Block 404 represents location lookup services that may be provided by the centralized web services computer system 202 to the funds transfer service provider computers. For example, each funds transfer service provider computer may have been assigned an ID having certain associated lookup privileges. The lookup privileges may include, as to a certain country or countries, the ability to inquire of the centralized web services computer system 202 as to whether a given payment card account has been issued in the country in question. Other lookup privileges may allow a service provider to inquire of the centralized web services computer system 202 as to whether the service provider is authorized to initiate a funds transfer from one particular country to another particular country. Such a country X to country Y transfer capability may be referred to as a transfer corridor. The centralized web services computer system 202 may service these lookup requests by referring to databases stored by the centralized web services computer system 202.

Block 406 represents eligibility lookup services that may be provided by the centralized web services computer system 202 to the funds transfer service provider computers and/or the FI computers. These services may allow a service provider or FI to ascertain whether a user (identified by name and address and/or account number) is on a blacklist such that funds transfers from and/or to the user are not permitted. The centralized web services computer system 202 may respond to requests for this service by referring to one or more blacklist databases maintained by the centralized web services computer system 202.

Block 408 represents mapping services that the centralized web services computer system 202 may provide to service providers and/or FIs. The mapping services may, for example, respond to a request for a user's payment card account number or direct deposit account number where the requester provides the user's mobile telephone number or e-mail address. Other forms of mapping one type of identifying data to another may be provided as part of these services. The centralized web services computer system 202 may also handle registration and storage of the data necessary to perform these mapping services.

Block 410 represents notification services that the centralized web services computer system 202 may provide to service providers. The notification services may support messaging to users, including messages that notify a recipient of a funds transfer in his/her favor, confirmation to a sender that a transaction was completed successfully, and/or warning messages to account holders that an account has a low balance or is due to expire.

Referring again to FIG. 3, a further application/program module 316, also stored on the storage device 304, may allow the centralized web services computer system 202 to aid in the completion of transactions. For example, the transaction management application/program module 316 may relay to FIs instructions from service providers in regard to instructions to credit or debit direct deposit accounts (DDAs), or instructions to initiate payment transactions in a payment card system to effect a funds transfer from the sender's payment card account to the recipient's payment card account.

Block 318 in FIG. 3 represents a messaging gateway, by which the centralized web services computer system 202 may transmit or relay messages to users who are not served by service providers. For example, the messaging gateway 318 may handle dispatching of electronic mail messages to users'computers and/or SMS messaging to users'mobile telephones.

Block 320 represents a gateway by which the centralized web services computer system 202 provides access for routing remittance transactions to a funds transfer back-bone that is an alternative to the payment system 102 shown in FIG. 1. For example, the alternative back-bone may be a payment system that is operated by a different payment card association from the association that operates the payment system 102. This may make it possible to make a funds transfer from a card account issued under one association brand to a card account issued under a different association brand. Other possible auxiliary back-bones may include a bill payment network, a system for transferring funds among direct deposit accounts, or another type of payment system such as those provided by WESTERN UNION or PAYPAL.

Block 322 represents a reporting engine. The reporting engine 322 may generate both pre-scheduled reports and reports on demand with respect to any or all operations of the centralized web services computer system 202.

As indicated at 324, the storage device 304 may store one or more databases of information relevant to remittance activities. The databases may include, for example, (a) a database of transactions, requests, etc. handled by the centralized web services computer system 202, (b) a table of routing information for users of the system 200, (c) a database for mapping user identification information to user bank/payment card account numbers and vice versa, (d) a blacklist database.

In addition to the software programs expressly listed above, the centralized web services computer system 202 may be programmed with other software, such as one or more operating systems, device drivers, database management programs, programs to enable the centralized web services computer system 202 to perform web server functions, communication software, etc.

Figure 5:
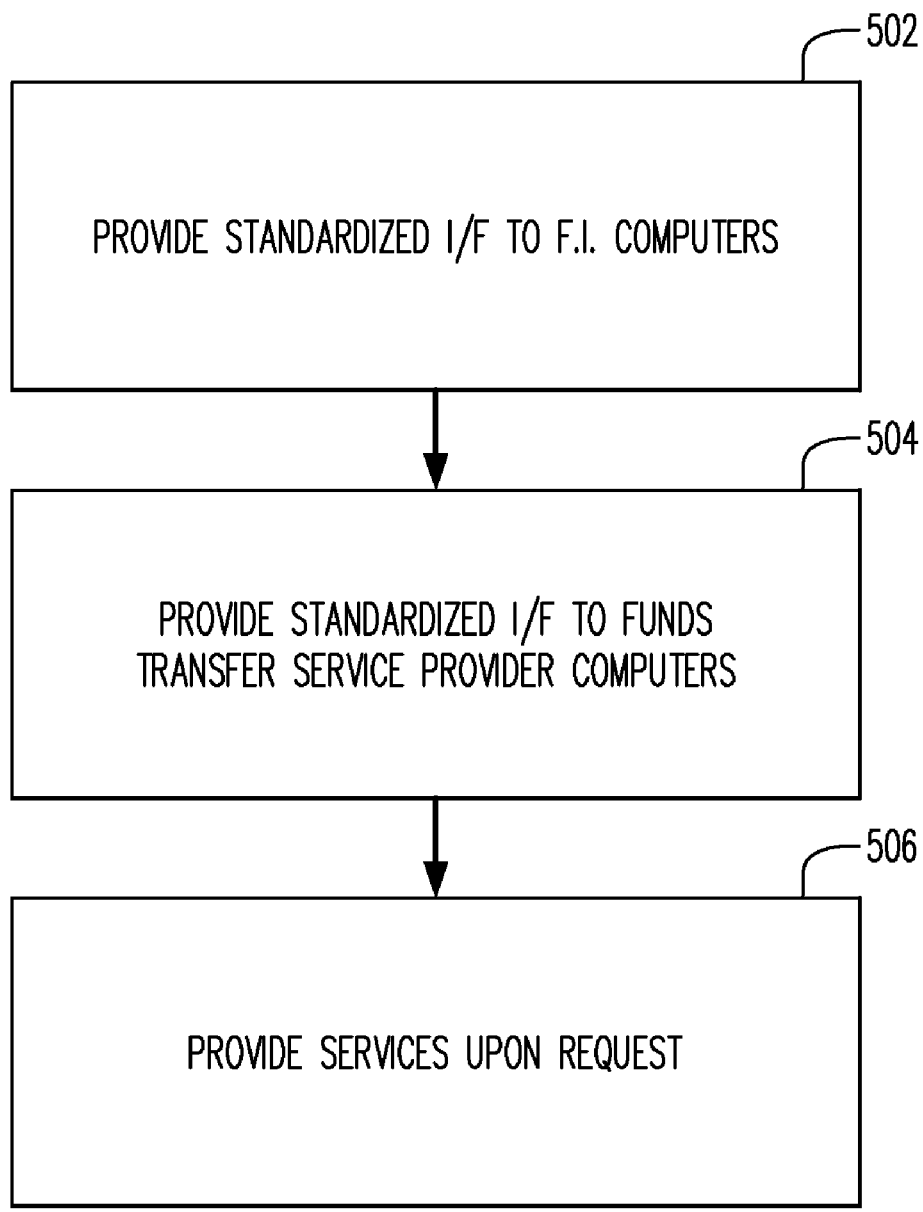
FIGS. 5-12 are flow charts that illustrate processes that may be performed in accordance with aspects of the present invention by the centralized web services computer system of FIG. 3.

FIG. 5 is a flow chart that illustrates at a high level operation of the centralized web services computer system 202.

At block 502 in FIG. 5, the centralized web services computer system 202 operates to provide a standardized interface for FI computers to access services provided by the centralized web services computer system 202. The standardized interface for FI computers may, for example, include standard data messaging formats, including data element type and length or size for each data element for each type of data message to be sent or received by the FI computers in communicating with the centralized web services computer system 202.

At block 504, the centralized web services computer system 202 operates to provide a standardized interface for funds transfer service provider computers to access services provided by the centralized web services computer system 202. The standardized interface for funds transfer service provider computers may, for example, include standard data messaging formats, including data element type and length or size for each data element for each type of data message to be sent or received by the funds transfer service provider computers in communicating with the centralized web services computer system 202.

At block 506, the centralized web services computer system 202 provides services to FI computers and funds transfer service provider computers in response to requests for services. Examples of requests for services and responses by the centralized web services computer system 202 are described below.

The provision of standard interfaces for service providers and FIs allows them to integrate once, with the system, as a preliminary to interaction with numerous service providers or FIs. This may be much more cost effective for service providers and FIs than integrating their IT systems individually with each service provider or FI with which the FI or service provider desires to cooperate for remittance transactions.

Figure 6:
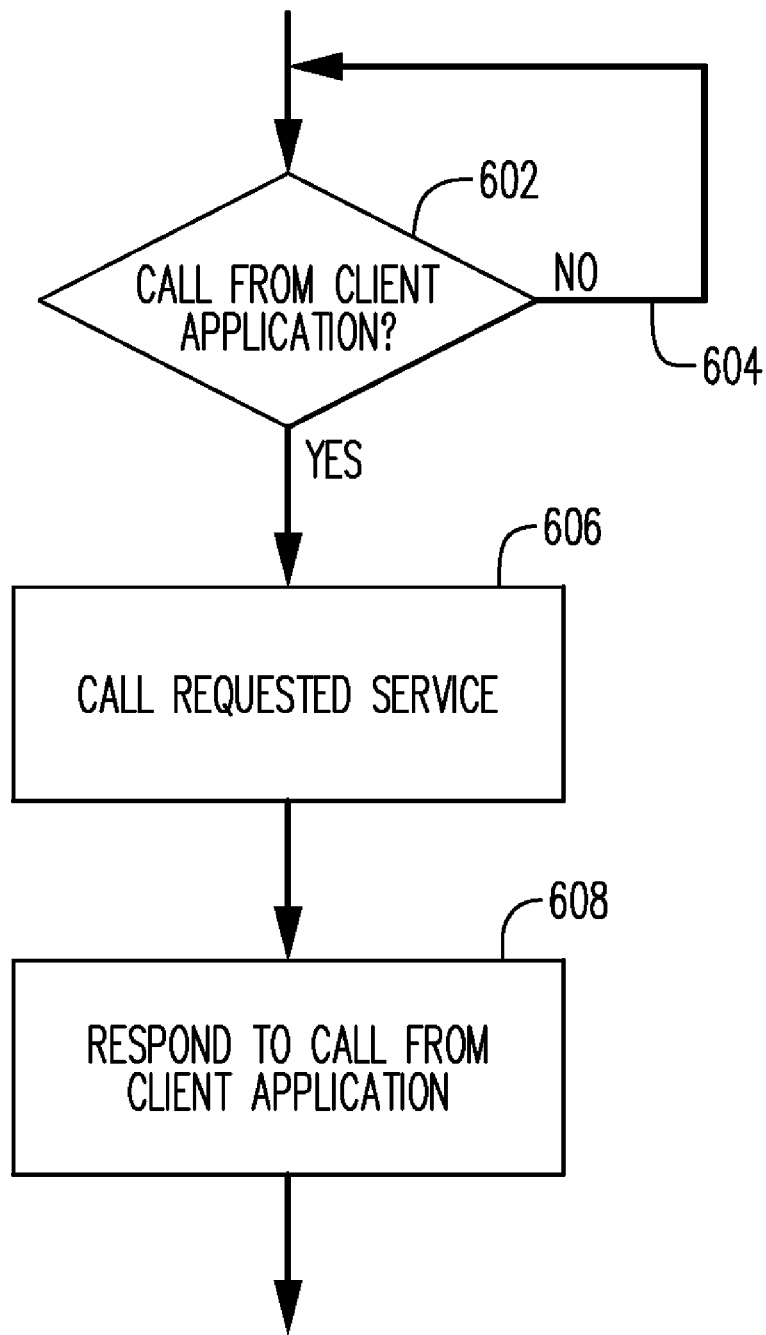

FIG. 6 is a flow chart that illustrates a process by which the centralized web services computer system 202 responds to a request for web integration services from an FI computer.

At 602 in FIG. 6, the centralized web services computer system 202 determines whether it has received a function call from a client application program operating on one of the FI computers. The client application program may, for example, provide an online banking environment for customers of the FI, or may provide a web-based customer service environment to be used by customer service representatives in the employ of the FI.

As indicated by branch 604 from decision block 602, the process of FIG. 6 may idle until a function call is received from an FI client application program. If it is determined that a function call has been received from an FI client application program, then the process of FIG. 6 advances from decision block 602 to block 606. At block 606, the service requested by the function call is invoked. The requested service may, for example, allow a customer of the FI, interacting with the requested service via the FI online banking environment, to register as a user of the funds transfer system 100, or to update information relating to a prior registration by the customer.

In addition or alternatively, the requested service may allow the FI CSR (customer service representative) to handle user registration or updating of a user registration on behalf of the customer, by interacting with the centralized web services computer system 202 via the FI's CSR web environment.

Another service that may be requested allows the user, via the FI online banking environment, to engage in management of his/her account, including performing functions such as adding/changing/removing user identifiers (such as nicknames, telephone numbers, email addresses, Instant Messaging user names from various networks), adding/changing/removing payment accounts associated with the service, adding/changing/removing notification settings for alerting the user to a certain account status or account activity, adding/changing/removing transaction limits. A similar service may also be provided by the centralized web services computer system 202 to allow an FI CSR to handle these functions for the customer via the FI's CSR web environment.

Still another service that the centralized web services computer system 202 may offer in terms of web integration would allow user account administration by an FI CSR via the FI's CSR web environment. For example, the user account administration capabilities provided to an FI CSR by the centralized web services computer system 202 may encompass all of the account management functions provided to the user as described in the preceding paragraph and may further encompass blocking, suspending, and closing accounts, or flagging accounts for attention by other departments such as Risk Management and others. Still further the account administration capabilities provided to the FI CSR may include logging points of contact with the user/customer and logging the communication channel and notes for interactions with the customer, so as to provide a track record of the CSR's dealing with the user and the user's account.

Yet another service that the centralized web services computer system 202 may offer to customers allows them to initiate remittance transactions via the FI online banking environment.

Still further, the centralized web services computer system 202 may offer services, accessible via the FI's online banking or CSR web environment, for viewing service usage history by the customer or CSR.

In the process of FIG. 6, step 608 follows step 606. At 608, the requested service is provided to the calling client application program by operation of the service that was invoked at 606.

Figure 7:
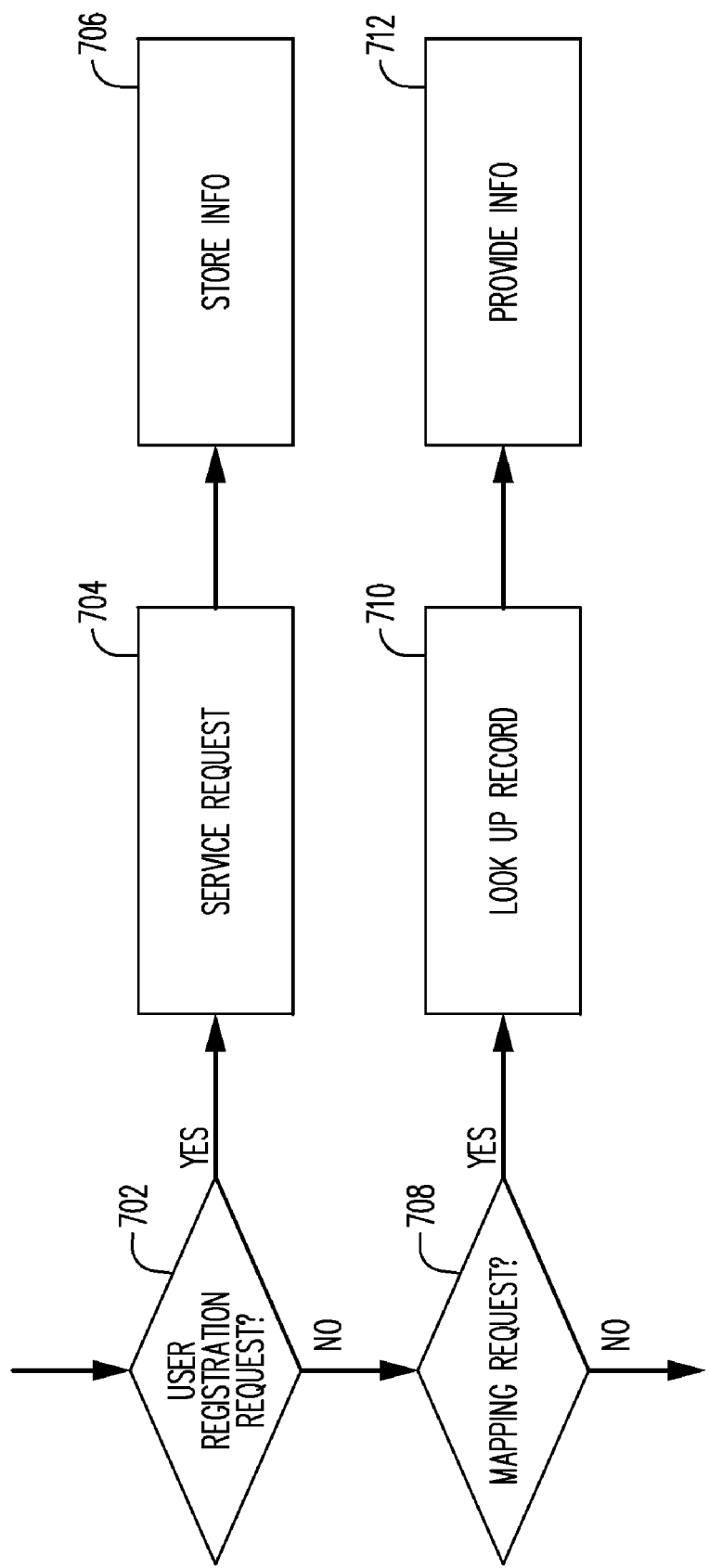

FIG. 7 is a flow chart that illustrates operation of the centralized web services computer system 202 in connection with data storage for, and responses to, mapping service requests.

At decision block 702, the centralized web services computer system 202 determines whether it has received a request to store data that may be used to respond to mapping requests. For example, a user may submit such a request in order to register his/her identifying data (name plus address and/or mobile telephone number and/or e-mail address and/or username) in association with his/her account information (payment card account number and/or DDA account number plus name of the user's bank).

If it is determined at 702 that such a request to store data has been received, then block 704 follows decision block 702. At block 704, the centralized web services computer system 202 handles the request to store data. This may, for example, include prompting the user to enter the necessary data. Then, at 706, the centralized web services computer system 202 stores the entered data in the mapping database.

In the absence of a request to store mapping data, the process of FIG. 7 may advance from decision block 702 to decision block 708. At decision block 708, the centralized web services computer system 202 determines whether it has received a request to map user identifying data into user account information (or a request to map user account information into user identifying data).

If it is determined at 708 that a mapping request has been received, then block 710 follows decision block 708. At block 710, the centralized web services computer system 202 uses the user identification or user account information, as the case may be, to access the record for the user that is maintained in the mapping database. Then, at 712, the centralized web services computer system 202 responds to the request by providing the requested information.

The following examples illustrate potential uses of the mapping services illustrated in FIG. 7.

In the first mapping service example, assume that a service provider has been requested by the user to initiate a remittance transaction, and that the user has identified himself/herself to the service provider by the user's mobile telephone number. The service provider may use the mapping service provided by the centralized web services computer system 202 to determine the user's payment card account number so that the service provider may instruct the user's issuing FI to undertake a payment transaction to transfer funds from the user's payment card account.

Similarly, the user may have identified the recipient of the remittance transaction to the service provider by the recipient's mobile telephone number. Again in this case, the service provider may avail itself of the mapping service provided by the centralized web services computer system 202 to ascertain the recipient's payment card account number, and may then use the resulting information from the mapping service request as the identity of the target recipient account for the payment transaction request.

In another mapping service example, the receiving FI may have identified the recipient to his/her service provider by the recipient's payment card account number. In this example, the recipient's service provider may submit a mapping service request to the centralized web services computer system 202 to obtain a mobile telephone number and/or e-mail address for the recipient so that the service provider can proceed to notify the recipient that funds have been transferred to the recipient's payment card account.

Figure 8:
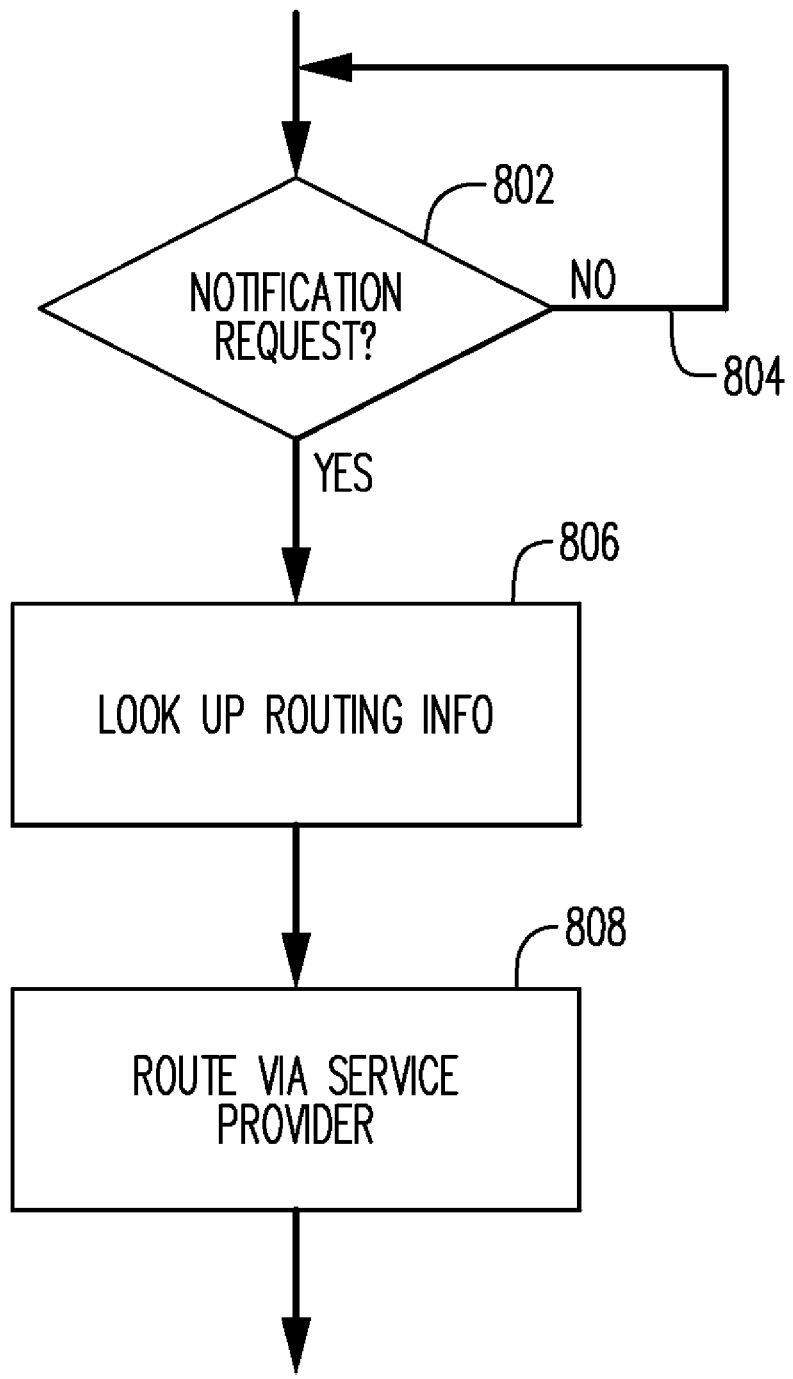

FIG. 8 is a flow chart that illustrates a process in which the centralized web services computer system 202 responds to a request that the centralized web services computer system 202 provide a notification to a user.

At 802 in FIG. 8, the centralized web services computer system 202 determines whether it has received a request that it provide a notification. The types of notification that may be handled via the process of FIG. 8 may include, for example, notifications to recipients that remittance transactions are pending, confirmation messages to senders and/or recipients that remittance transactions have been completed successfully, notifications that remittance transactions have failed, or warning messages. Examples of warning messages may include a notice that the user's account balance has fallen below a threshold amount, or that the account is due to expire. Other notifications may include updating of account terms and conditions.

As indicated by branch 804 from decision block 802, the process of FIG. 8 may idle until a request is received to provide a notification. If it is determined at 802 that such a request has been received, then the process of FIG. 8 advances from decision block 802 to block 806. At block 806, the centralized web services computer system 202 refers to a routing table or an appropriate database to determine how to route the notification. For example, if the notification is to go to the recipient of a remittance transaction, the centralized web services computer system 202 may look up the recipient's service provider in a record stored with respect to the recipient, and then (block 808) the centralized web services computer system 202 may route the notification to the recipient via the recipient's service provider.

In another example, if there is no service provider on record for the user who is to receive the notification, but an e-mail address or mobile telephone number is available for the user, then the centralized web services computer system 202 may operate the messaging gateway to route the notification to the user via email or SMS.

With the provision of notification services, there may be effective indirect connections between service providers and FIs to allow messages to flow as needed within the system 200.

To support messaging and/or reporting, it may be the case that service providers log with the centralized web services computer system 202 at least some details about each remittance transaction. These details may include, for example, the originating channel (i.e., how the sender contacted the sending service provider), the amount of funds transferred, the type of funding account and a full date and time stamp.

Figure 9:
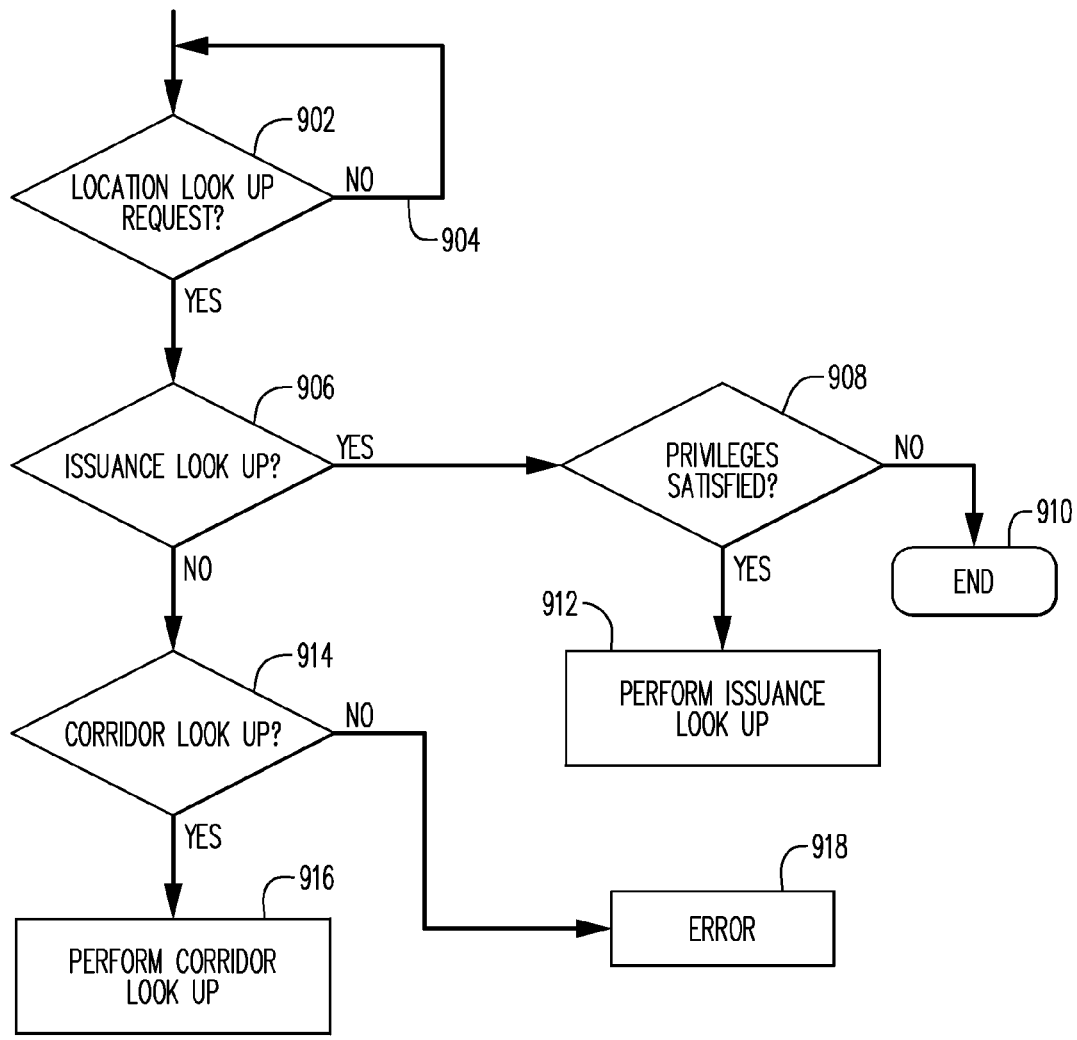

FIG. 9 is a flow chart that illustrates a process by which the centralized web services computer system 202 responds to a request for location lookup service from a funds transfer service provider computer.

At 902 in FIG. 9, the centralized web services computer system 202 determines whether it has received a request for location lookup service. As indicated by branch 904 from decision block 902, the process of FIG. 9 may idle until such a request is received. If the centralized web services computer system 202 determines at decision block 902 that such a request has been received, then the process of FIG. 9 advances from decision block 902 to decision block 906. At decision block 906, the centralized web services computer system 202 determines whether the location lookup request relates to an issuance lookup. The term "issuance lookup" refers to determining whether a specified payment card account (i.e., a payment card account specified by a particular payment card account number) has been issued in a specified country.

If at decision block 906 the centralized web services computer system 202 makes a positive determination (i.e., the centralized web services computer system 202 determines that the received location lookup request relates to an issuance lookup), then the process of FIG. 9 advances from decision block 906 to decision block 908. At decision block 908, the centralized web services computer system 202 determines whether the service provider which made the request has been assigned the privilege of requesting issuance lookups in the specified country. If not, then the process ends (at 910) without the centralized web services computer system 202 having performed the requested lookup. However, if the centralized web services computer system 202 determines at decision block 908 that the requesting service provider has been assigned the required privilege, then the process of FIG. 9 advances from decision block 908 to block 912.

At block 912, the centralized web services computer system 202 performs the requested issuance lookup. That is, the centralized web services computer system 202 refers to a database to determine whether the specified payment card account has been issued in the specified country. The centralized web services computer system 202 then responds to the issuance lookup request by indicating the results of the lookup to the requesting service provider.

Referring again to decision block 906, if the centralized web services computer system 202 makes a negative determination at that decision block (i.e., if the centralized web services computer system 202 determines that the location lookup request does not relate to an issuance lookup), then the process of FIG. 9 advances from decision block 906 to decision block 914. At decision block 914, the centralized web services computer system 202 determines whether the location lookup request relates to a corridor lookup. The term "corridor lookup" refers to determining whether the requesting service provider is authorized to initiate a remittance transaction from a first specified country to a second specified country. If the centralized web services computer system 202 determines at decision block 914 that the requested location lookup is a corridor lookup, then the process of FIG. 9 advances from decision block 914 to block 916.

At block 916, the centralized web services computer system 202 performs the requested corridor lookup. That is, the centralized web services computer system 202 refers to a database to determine whether the requesting service provider is authorized to initiate remittance transactions from the first specified country to the second specified country. The centralized web services computer system 202 then responds to the corridor lookup request by indicating the results of the lookup to the requesting service provider.

If the centralized web services computer system 202 makes a negative determination at decision block 914, then the process of FIG. 9 ends with an error indication (918 in FIG. 9).

Figure 10:
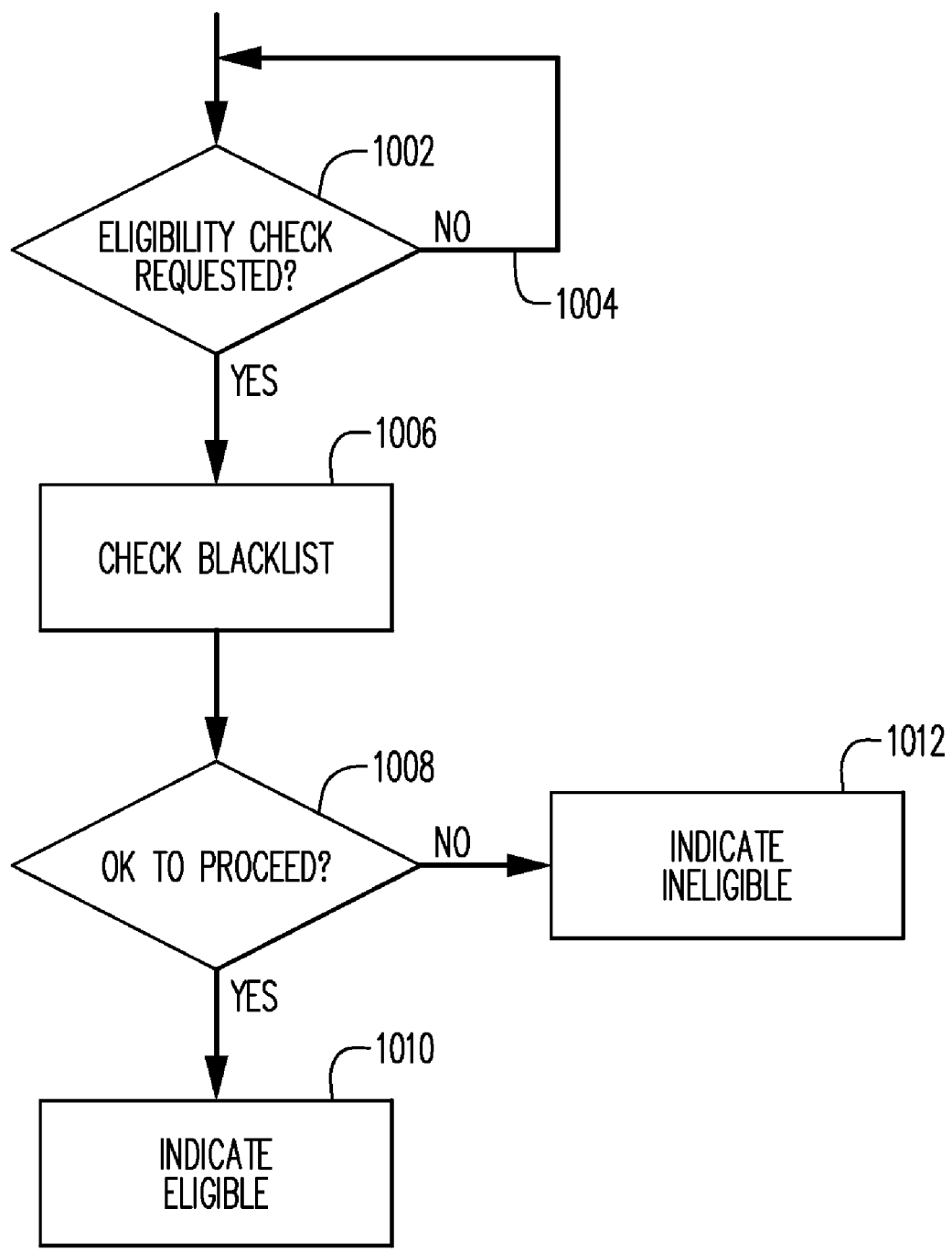

FIG. 10 is a flow chart that illustrates a process by which the centralized web services computer system 202 checks the eligibility of users for participation in remittance transactions.

At 1002 in FIG. 10, the centralized web services computer system 202 determines whether it has received a request (e.g. from a service provider) to check whether a sender and/or a recipient for a proposed remittance transaction is eligible for the transaction to proceed.

As indicated by branch 1004 from decision block 1002, the process of FIG. 10 may idle until a request to check user eligibility is received. However, if the centralized web services computer system 202 determines that it has received such a request, then the process of FIG. 10 advances from decision block 1002 to block 1006.

At block 1006, the centralized web services computer system 202 checks a blacklist database to determine whether a user and/or user account number referred to in the request is included on a blacklist. In some embodiments, users and/or their accounts may be placed on the blacklist for a number of reasons, such as commission of fraud or suspicion of fraudulent activity in connection with a particular account, or being named on a government watchlist, such as for suspicion of money laundering activity.

Based on the result of checking the blacklist database, the centralized web services computer system 202 determines at decision block 1008 whether the user/account in question is eligible for the transaction. If so, the centralized web services computer system 202 indicates (block 1010) to the requesting service provider that the user/users/account/accounts in question is/are eligible for the transaction to proceed. But if the centralized web services computer system 202 determines otherwise, then it indicates (block 1012) to the requesting service provider that the user/users/account/accounts in question is/are ineligible for the transaction to proceed.

In the process of FIG. 10, the centralized web services computer system 202 may receive requests from FIs in addition to or instead of receiving requests from service providers.

In some embodiments, the process of checking user/account eligibility may be integrated with the centralized web services computer system 202 handling requests to forward instructions to implement remittance transactions. Thus, the process illustrated in FIG. 10 may in some embodiments be integrated with the process described below with reference to FIG. 11. When a user fails the eligibility check, the requested transaction may be aborted.

Figure 11:
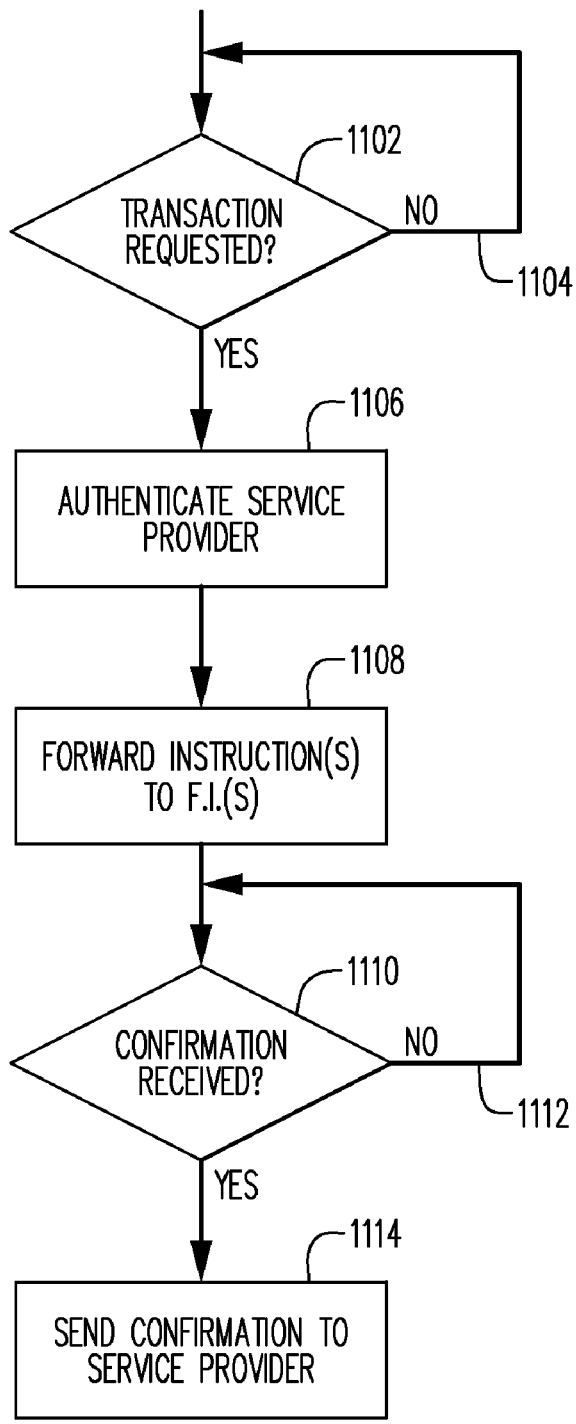

FIG. 11 is a flow chart that illustrates a process by which the centralized web services computer system 202 handles requests for remittance transactions. The requests may be received from service providers, and in handling the requests, the centralized web services computer system 202 may effectively provide links between service providers and the FIs that implement the actual funds transfers.

At 1102 in FIG. 11, the centralized web services computer system 202 determines whether it has received a request to facilitate a remittance transaction. As indicated by branch 1104 from decision block 1102, the process of FIG. 11 may idle until such a request is received. However, if the centralized web services computer system 202 determines that it has received such a request, then the process of FIG. 11 advances from decision block 1102 to block 1106.

At block 1106, the centralized web services computer system 202 may undertake a suitable authentication procedure to confirm that the service provider and the request are legitimate. Then, at 1108, the centralized web services computer system 202 may forward instructions to one or more FIs to implement the requested remittance transaction. For example, in the case where the remittance transaction is to be implemented with a payment transaction in a payment card account system, the centralized web services computer system 202 may forward an instruction to the sending FI directing the sending FI to initiate the payment transaction to effect transfer of the remittance from the sender's payment card account (issued by the sending FI) to the recipient's payment card account.

In other cases, for example, the remittance transaction may call for funds to be transferred from a DDA belonging to the sender and/or to a DDA belonging to the recipient. In such cases the centralized web services computer system 202 may issue instructions to FIs to implement the required transfers. For example, the centralized web services computer system 202 may issue instructions to implement transactions in which general ledger transfers may be made from the sender's DDA to an account that is accessible by a payment card system (and/or from another account that is accessible by the payment card system to the recipient's DDA) to facilitate remittance transactions via a payment card system even when the sender or recipient does not have a payment card account.

Instructions to be issued by the centralized web services computer system 202 pursuant to step 1108 may also facilitate remittance transactions that are not implemented via a payment card system. For example, such instructions may implement remittance transactions via an auxiliary backbone, as referred to hereinabove.

Following block 1108 in FIG. 11 is a decision block 1110. At decision block 1110 the centralized web services computer system 202 determines whether it has received, from the FI or FIs in question, confirmation that the desired remittance transaction has been completed successfully. As indicated by branch 1112 from decision block 1110, the process of FIG. 11 may idle until confirmation is received. But when the confirmation is received, the process advances from decision block 1110 to block 1114. At block 1114, the centralized web services computer system 202 sends a confirmation to the service provider to indicate that the remittance transaction has been completed successfully.

Figure 12:
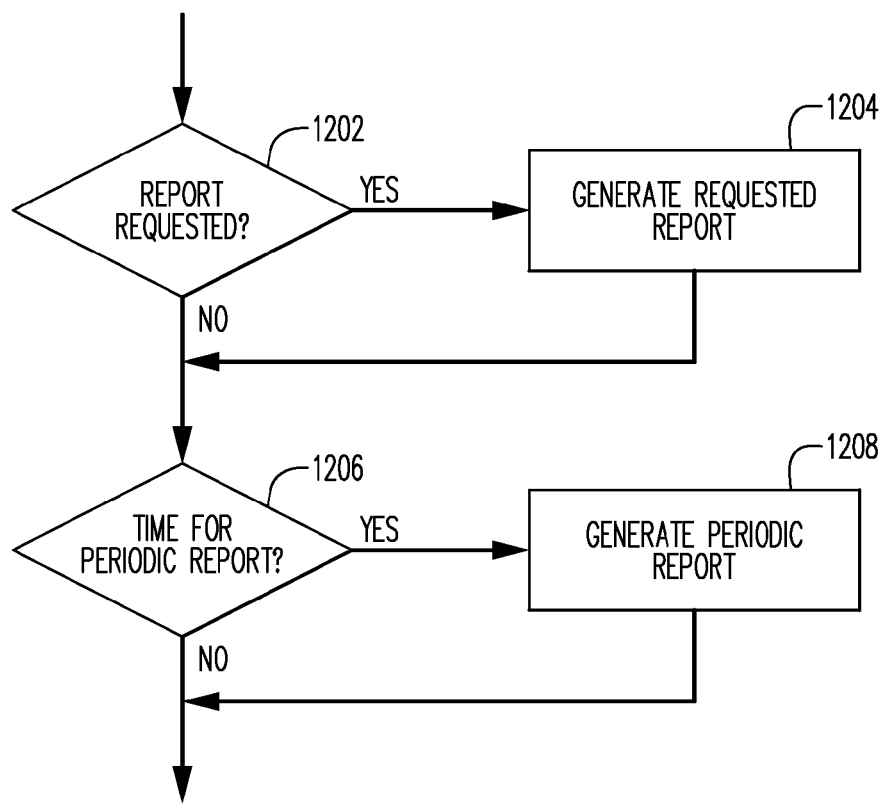

FIG. 12 is a flow chart that illustrates a process performed by the centralized web services computer system 202 in connection with generating reports concerning activities of the centralized web services computer system 202.

At 1202 in FIG. 12, the centralized web services computer system 202 determines whether it has received a request for a report. For example, the centralized web services computer system 202 may receive a request from a service provider for the centralized web services computer system 202 to report all transactions the centralized web services computer system 202 has handled at the request of the service provider during the past calendar quarter.

In other cases, the centralized web services computer system 202 may receive similar requests from FIs.

If at 1202 the centralized web services computer system 202 determines that it has received a request for a report, then block 1204 follows decision block 1202. At block 1204, the centralized web services computer system 202 generates and transmits the requested report.

If the centralized web services computer system 202 has not received a request for a report, then decision block 1206 follows decision block 1202. At decision block 1206 the centralized web services computer system 202 determines whether the scheduled time has arrived at which the centralized web services computer system 202 is to generate a regularly scheduled report of its activities. If so, then block 1208 follows decision block 1206. At block 1208, the centralized web services computer system 202 generates the scheduled report.

If the centralized web services computer system 202 makes a negative determination at decision block 1206, then it does not generate any report, and the process of FIG. 12 may then loop back from decision block 1206 to decision block 1202.

The reporting engine would have pre-defined reports for transaction and usage reports allowing business intelligence personnel to analyze service usage, or financial and accounting personnel to pull reports that they require. Furthermore, custom-made reports can be specified and configured in the reporting engine that can be requested by FIs and non-FIs connected to the system. Every action on the system should be reportable, including user registrations, transactions and their status, account changes, loading accounts, unloading accounts, locations, channels, etc.

The centralized web services computer system 202 may also provide messaging and/or mapping services to support balance inquiries in the remittance system 100 whereby users are allowed to inquire about a current balance or balances in their account(s).

The services described herein with respect to FIGS. 5-12 may be accessible by one or both of the interfaces 310, 312 discussed above in connection with FIG. 3.

The remittance transactions described herein may occur entirely within the same country or may cross an international border such that the sending FI and the receiving FI are in different countries. In the later circumstance, the remittance transaction may entail a currency conversion.

It is noted that "payment transaction" is a term of art in the field of payment card systems, and refers to a transaction in which—in contradistinction to a purchase transaction—funds flow from an acquirer to an issuer as a credit to an account to which the transaction is routed. In this context, the sending FI may be considered to be an acquirer and the receiving FI may be considered to be an issuer.

The flow charts and descriptions thereof herein should not be understood to prescribe a fixed order of performing the method steps described therein. Rather the method steps may be performed in any order that is practicable. In some embodiments, for example, steps may be omitted, including e.g., transaction request confirmation and authentication, or clearing process steps.

As should be clear from the preceding discussion, one or more of the process steps indicated in FIGS. 5-12 are or may be performed using a computer or more than one computer.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions and operated under the name of MASTERCARD, VISA, Express AMERICAN EXPRESS, DINERS CLUB, DISCOVER CARD or a similar system. In some embodiments, the term "payment card system" may be limited to systems in which member financial institutions issue payment card accounts to individuals, businesses and/or other organizations.

As used herein and in the appended claims, the term "originating FI" or "sending FI" refers to a financial institution from which a remittance is made.

As used herein and in the appended claims, the term "receiving FI" refers to a financial institution to which a remittance is sent for the benefit of the recipient of the remittance.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method of operating a centralized web services computer system, the method comprising:
   providing a first standard interface for permitting computers operated by a plurality of financial institutions to interact with the centralized web services computer system, said first standard interface being a first application programming interface and defining a first set of data messaging formats for first data messages sent or received by the computers operated by the financial institutions in communicating with the centralized web services computer system, the first set of data messaging formats including data element type and length or size for each data element for said first data messages;
   providing a second standard interface for permitting computers operated by a plurality of funds transfer service providers to interact with the centralized web services computer system, said second standard interface being a second application programming interface and defining a second set of data messaging formats for second data messages sent or received by the computers operated by the funds transfer service providers in communicating with the centralized web services computer system, the second set of data messaging formats including data element type and length or size for each data element for said second data messages, said second standard interface different from said first standard interface;
   providing an auxiliary gateway to route remittance transactions to a funds transfer back-bone that comprises an alternative payment system that enables funds transfers from payment card accounts issued under a first brand to different payment card accounts issued under a second brand; and
   providing a plurality of services in the centralized web services computer system, said services each accessible via at least one of said first and second standard interfaces, said services including:
   (a) services that integrate operation of the centralized web services computer system into web environments provided by said computers operated by said plurality of financial institutions; and
   (b) services that provide look-up of territory-related information including determining that a service provider has been assigned the privilege to request issuance lookups in a specified first country, determining that a specified payment card account has been issued in the specified first country, and determining that the service provider is authorized to initiate a funds transfer between the specified first country and a specified second country.

2. The method of claim 1, wherein the plurality of services in the centralized web services computer system further comprise at least one of:
   (c) services for mapping and/or looking up user identifiers relative to financial account identifiers and/or financial account identifiers relative to user identifiers;
   (d) services for routing messages among users and/or funds transfer service providers;
   (e) services for looking up account blacklist statuses;
   (f) services for issuing account debit or credit instructions; and
   (g) services for generating reports of activities of the centralized web services computer system.

3. The method of claim 1, wherein said services for integrating operation of the centralized web services computer system into web environments include provision of services to customers and customer service representatives of said financial institutions.

4. The method of claim 2, wherein said user identifiers include at least one of users' mobile telephone numbers and e-mail addresses.

5. The method of claim 2, wherein said services for routing messages among users include services for routing, to users, notifications of pending and/or completed transactions, said services for routing including looking up a service provider that provides services to a user.

6. The method of claim 2, wherein said services for routing messages include services for routing, to users, warnings concerning account expiration and/or low account balances.

7. The method of claim 2, wherein the services for issuing debit or credit instructions provide services to issue debit or credit instructions with respect to direct deposit accounts.

8. The method of claim 2, wherein the services for issuing debit or credit instructions provide services to issue debit or credit instructions with respect to payment card accounts.

9. A centralized web services computer system, comprising:
   at least one processor;
   at least one memory device in communication with the at least one processor and storing program instructions, the at least one processor operative with the program instructions to:
   provide a first standard interface for permitting computers operated by a plurality of financial institutions to interact with the centralized web services computer system, said first standard interface being a first application programming interface and defining a first set of data messaging formats for first data messages sent or received by the computers operated by the financial institutions in communicating with the centralized web services computer system, the first set of data messaging formats including data element type and length or size for each data element for said first data messages;
   provide a second standard interface for permitting computers operated by a plurality of funds transfer service providers to interact with the centralized web services computer system, said second standard interface being a second application programming interface and defining a second set of data messaging formats for second data messages sent or received by the computers operated by the funds transfer service providers in communicating with the centralized web services computer system, the second set of data messaging formats including data element type and length or size for each data element for said second data messages, said second standard interface different from said first standard interface;

provide an auxiliary gateway to route remittance transactions to a funds transfer back-bone that comprises an alternative payment system that enables funds transfers from payment card accounts issued under a first brand to different payment card accounts issued under a second brand; and provide a plurality of services in the centralized web services computer system, said services each accessible via at least one of said first and second standard interfaces, said services including:
  (a) services that integrate operation of the centralized web services computer system into web environments provided by said computers operated by said plurality of financial institutions;
  (b) services that provide lookup account blacklist statuses; and
  (c) services that provide look-up of territory-related information including determining that a service provider has been assigned the privilege to request issuance lookups in a specified first country, determining that a specified payment card account has been issued in the specified first country, and determining that the service provider is authorized to initiate a funds transfer between the specified first country and a specified second country.

10. The centralized web services computer system of claim 9, wherein the plurality of services provided in the centralized web services computer system further comprise at least one of:
  (d) services for mapping and/or looking up user identifiers relative to financial account identifiers and/or financial account identifiers relative to user identifiers;
  (e) services for routing messages among users and/or funds transfer service providers;
  (f) services for issuing account debit or credit instructions; and
  (g) services for generating reports of activities of the centralized web services computer system.

11. The centralized web services computer system of claim 9, wherein said services for integrating operation of the centralized web services computer system into web environments include provision of services to customers and customer service representatives of said financial institutions.

12. The centralized web services computer system of claim 10, wherein said user identifiers include at least one of users' mobile telephone numbers or e-mail addresses or Instant Messaging user identifiers or social network user identifiers.

13. The centralized web services computer system of claim 10, wherein said services for routing messages include services for routing, to users, notifications of pending and/or completed transactions, said services for routing including looking up a service provider that provides services to a user.

14. The centralized web services computer system of claim 10, wherein said services for routing messages include services for routing, to users, warnings concerning at least one of account expiration or low account balances.

15. The centralized web services computer system of claim 10, wherein said territory-related information indicates whether a funds transfer service provider is authorized to initiate a funds transfer from a given first country to a given second country.

16. The centralized web services computer system of claim 10, wherein the services for issuing debit or credit instructions provide services for issuing debit or credit instructions with respect to direct deposit accounts.

17. The centralized web services computer system of claim 10, wherein the services for issuing debit or credit instructions provide services for issuing debit or credit instructions with respect to payment card accounts.

18. An article of manufacture comprising:
  a non-transitory computer usable medium having computer readable program code means embodied therein for operating a centralized web services computer system, the computer readable program code means in said article of manufacture comprising:
    computer readable program code means for providing a first standard interface for permitting computers operated by a plurality of financial institutions to interact with the centralized web services computer system, said first standard interface being a first application programming interface and defining a first set of data messaging formats for first data messages sent or received by the computers operated by the financial institutions in communicating with the centralized web services computer system, the first set of data messaging formats including data element type and length or size for each data element for said first data messages;
    computer readable program code means for providing a second standard interface for permitting computers operated by a plurality of funds transfer service providers to interact with the centralized web services computer system, said second standard interface being a second application programming interface and defining a second set of data messaging formats for second data messages sent or received by the computers operated by the funds transfer service providers in communicating with the centralized web services computer system, the second set of data messaging formats including data element type and length or size for each data element for said second data messages, said second standard interface different from said first standard interface;
    computer readable program code means for providing an auxiliary gateway to route remittance transactions to a funds transfer back-bone that comprises an alternative payment system that enables funds transfers from payment card accounts issued under a first brand to different payment card accounts issued under a second brand; and
    computer readable program code means for providing a plurality of services in the centralized web services computer system, said services each accessible via at least one of said first and second standard interfaces, said services including:
      (a) services that provide look-up of territory-related information including determining that a service provider has been assigned the privilege to request issuance lookups in a specified first country, determining that a specified payment card account has been issued in the specified first country, and determining that the service provider is authorized to initiate a funds transfer between the specified first country and a given specified second; and
      (b) services for looking up account blacklist statuses.

19. The article of manufacture of claim 18, wherein the computer readable program code means for providing the plurality of services in the centralized web services computer system further comprises code means to provide at least one of:
  (c) services for integrating operation of the centralized web services computer system into web environments provided by said computers operated by said plurality of financial institutions;
  (d) services for mapping and/or looking up user identifiers relative to financial account identifiers and/or financial account identifiers relative to user identifiers;

(e) services for routing messages among users and/or funds transfer service providers;
(f) services for issuing account debit or credit instructions; and
(g) services for generating reports of activities of the centralized web services computer system.

* * * * *